(12) United States Patent
Xiao et al.

(10) Patent No.: US 11,378,066 B2
(45) Date of Patent: Jul. 5, 2022

(54) METHOD AND APPARATUS TO CLEAN WIND TURBINE BLADES

(71) Applicants: InnovBot, LLC, River Edge, NJ (US); Research Foundation of the City University of New York, New York, NY (US)

(72) Inventors: Jizhong Xiao, River Edge, NJ (US); Guoyong Yang, River Edge, NJ (US); Yifeng Song, River Edge, NJ (US)

(73) Assignees: InnovBot, LLC, River Edge, NJ (US); Research Foundation of the City University of New York, New York, NY (US)

( * ) Notice: Subject to any disclaimer, the term of this patent is extended or adjusted under 35 U.S.C. 154(b) by 0 days.

(21) Appl. No.: 17/434,678

(22) PCT Filed: Feb. 28, 2020

(86) PCT No.: PCT/US2020/020327
§ 371 (c)(1),
(2) Date: Aug. 27, 2021

(87) PCT Pub. No.: WO2020/176839
PCT Pub. Date: Sep. 3, 2020

(65) Prior Publication Data
US 2022/0042495 A1    Feb. 10, 2022

Related U.S. Application Data

(60) Provisional application No. 62/811,785, filed on Feb. 28, 2019.

(51) Int. Cl.
*A47L 1/06* (2006.01)
*B08B 5/04* (2006.01)
(Continued)

(52) U.S. Cl.
CPC .............. *F03D 80/55* (2016.05); *B08B 1/005* (2013.01); *B08B 1/006* (2013.01); *B08B 1/008* (2013.01);
(Continued)

(58) Field of Classification Search
CPC ............ A47L 1/06; F03D 80/00; B08B 1/006
See application file for complete search history.

(56) References Cited

U.S. PATENT DOCUMENTS 5,890,250 A    4/1999 Lange et al.
6,286,179 B1 *  9/2001 Byrne ................ A61B 1/00119
134/169 C
(Continued)

FOREIGN PATENT DOCUMENTS

| EP | 3181027 | 6/2017 |
|---|---|---|
| WO | WO2011015786 | 2/2011 |
| WO | WO2015171874 | 11/2015 |

OTHER PUBLICATIONS

Serbot, Swiss Innovations; Serbot presents new cleaning solution for solar power plants; 2012; 2 pages.
(Continued)

*Primary Examiner* — Michael D Jennings
(74) *Attorney, Agent, or Firm* — Peter J. Mikesell; Schmeiser, Olsen & Watts, LLP

(57) ABSTRACT

A robot for cleaning and inspecting wind turbine blades. The robot has a module that adheres to the blade using a vacuum force. The robot also has a cleaning compartment is divided into two sections that are connected by a flexible section. The cleaning compartment is flexible such that it adapts to convex and concave curvatures on the blade.

17 Claims, 16 Drawing Sheets

(51) Int. Cl.
  *F03D 80/55* (2016.01)
  *B08B 1/00* (2006.01)
  *B08B 3/02* (2006.01)

(52) U.S. Cl.
  CPC .............. *B08B 3/024* (2013.01); *B08B 5/04* (2013.01); *A47L 1/06* (2013.01)

(56) References Cited

U.S. PATENT DOCUMENTS

| | | |
|---|---|---|
| 6,964,312 B2 | 11/2005 | Maggio |
| 7,520,356 B2 | 4/2009 | Sadegh et al. |
| 7,775,312 B2 | 8/2010 | Maggio |
| 8,661,598 B2 | 3/2014 | Alshehhi |
| 9,574,549 B2 | 2/2017 | Lee et al. |
| 10,532,781 B2 | 1/2020 | Xiao et al. |
| 2005/0285104 A1* | 12/2005 | Jeong ................ H01L 21/67028 257/48 |
| 2013/0145572 A1* | 6/2013 | Schregardus ....... A47L 11/4011 15/319 |
| 2013/0192632 A1 | 8/2013 | Cazzaniga |
| 2015/0375814 A1 | 12/2015 | Xiao et al. |
| 2020/0150670 A1 | 5/2020 | Xiao et al. |

OTHER PUBLICATIONS

Lamonica, M.; Not Afraid of Heights, Robot Inspect Wind Turbine; Technology Review; Jun. 14, 2012; 7 pages.

International Climbing Machines; Information Sheet; Jul. 2007; 7 pages.

ISA/US; International Search Report/Written Opinion for corresponding International Application PCT/US2020/020327 dated May 27, 2020; 9 pages.

\* cited by examiner

METHOD AND APPARATUS TO CLEAN WIND TURBINE BLADES

CROSS-REFERENCE TO RELATED APPLICATIONS

This application claims priority to and is a non-provisional of U.S. patent application Ser. No. 62/811,785 (filed Feb. 28, 2019) the entirety of which is incorporated herein by reference.

BACKGROUND OF THE INVENTION

The subject matter disclosed herein relates to a wind turbine inspection and cleaning system.

Wind turbines have multiple blades extending from a central cabin that is suspended above the ground by a tower. The cabin has an electric generator to generate electrical power as the blades rotated by the wind. The efficiency of power conversion is dependent on a variety of factors including surface smoothness of the blades. However, during operation, oil leakage, salty air from ocean, debris, insect bodies contaminates the blades which inhibits efficiency.

Regular visual inspection and cleaning of the blades reveals defects and promotes wind turbine efficiency. Cleaning is typically performed manually by human operators. However, such manual cleaning is dangerous, time consuming and expensive and is therefore often deferred. Consequently, wind turbines may operate in an inefficient manner for significant periods. An improved cleaning system would therefore be desired.

The discussion above is merely provided for general background information and is not intended to be used as an aid in determining the scope of the claimed subject matter.

SUMMARY

A robot for cleaning and inspecting a wind turbine blade. The robot has a module that adheres to the blade using a vacuum force. The robot also has a cleaning compartment is divided into two sections that are connected by a flexible section. The cleaning compartment is flexible such that it adapts to convex and concave curvatures on the blade.

In a first embodiment, a robot for cleaning wind turbine blades is provided. The robot comprising: a suction module comprising a suction chamber with an open bottom and a compliant seal assembly that circumscribes the open bottom, wherein the compliant seal assembly contacts a surface; a vacuum motor assembly for expelling air from the suction chamber, thereby adhering the open bottom to the surface; a means for moving the robot along the surface; a flexible cleaning ring circumscribing an opening on a bottom side of the robot; a cleaning compartment comprising a cover with a first cleaning section flexibly joined to a second cleaning section by a flexible section, wherein the cover defines a bottom opening such that flexion of the flexible section bends the bottom opening in both a convex shape and a concave shape; at least one spray nozzle disposed inside the cleaning compartment for spraying pressurized water at the bottom opening to clean the surface.

In a second embodiment, a robot for cleaning wind turbine blades is provided. The robot comprising: a first suction module and a second suction module, each comprising a suction chamber with an open bottom and a flexible cleaning ring that circumscribes the open bottom, wherein the flexible cleaning ring contacts a surface; vacuum motor assembly for expelling air from the suction chamber, thereby adhering the open bottom to the surface; a means for moving the robot along the surface; a hinge that flexibly connects the first suction module to the second suction module such that the robot adjusts to non-planar areas on the surface; a cleaning compartment comprising a cover with a first cleaning section flexibly joined to a second cleaning section by flexible section, wherein the cover defines a bottom opening such that flexion of the flexible section bends the bottom opening in both a convex shape and a concave shape, the first cleaning section being connected to the first suction module by a first support and the second cleaning section being rigidly connected the second suction module by a second support, such that the cleaning compartment can flex to conform to non-planar areas on the surface; at least one spray nozzle disposed inside the cleaning compartment for spraying pressurized water at the bottom opening to clean the surface.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

This disclosure provides a cleaning and inspection apparatus with vertical mobility to clean wind turbine blades. The surface of a turbine blade is very complex and includes both a convex surface and a concave surface. If the cleaning robot is small enough, the blade's surface can be considered as flat surface because the convex and concave surfaces on the blade can be neglected. However, the cleaning efficiency of the robot may be unacceptably low if the robot is very small. To fix the conflict between the curved surface of the blade and the efficiency of the robot, improved robots are provided herein.

Figure 1A:
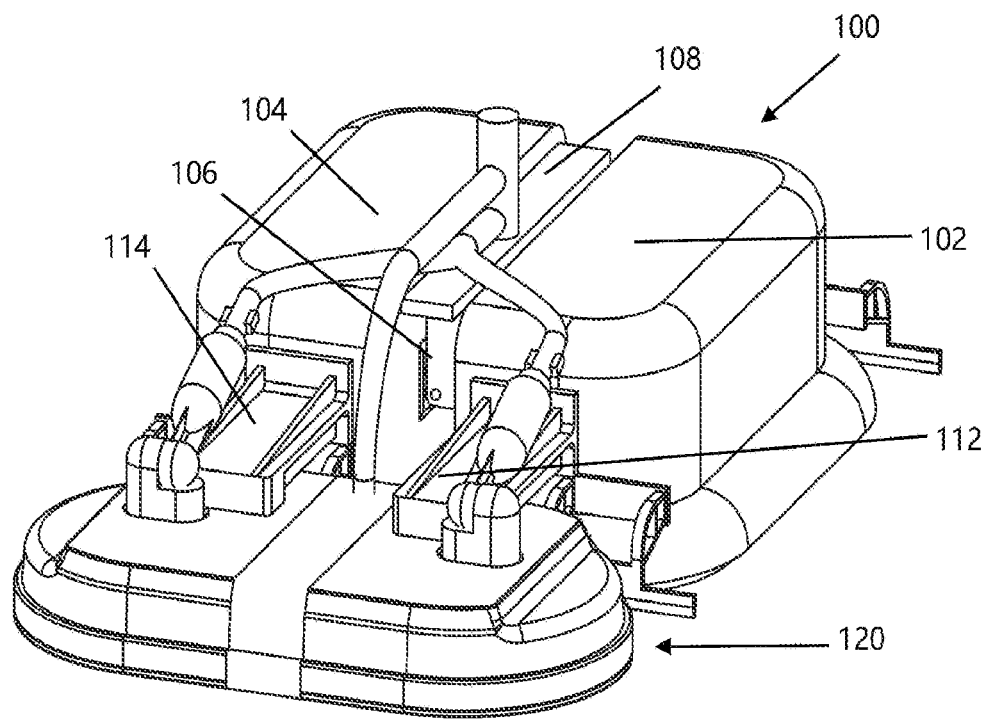
FIG. 1A is a perspective view of one embodiment of a robot.
Figure 1B:
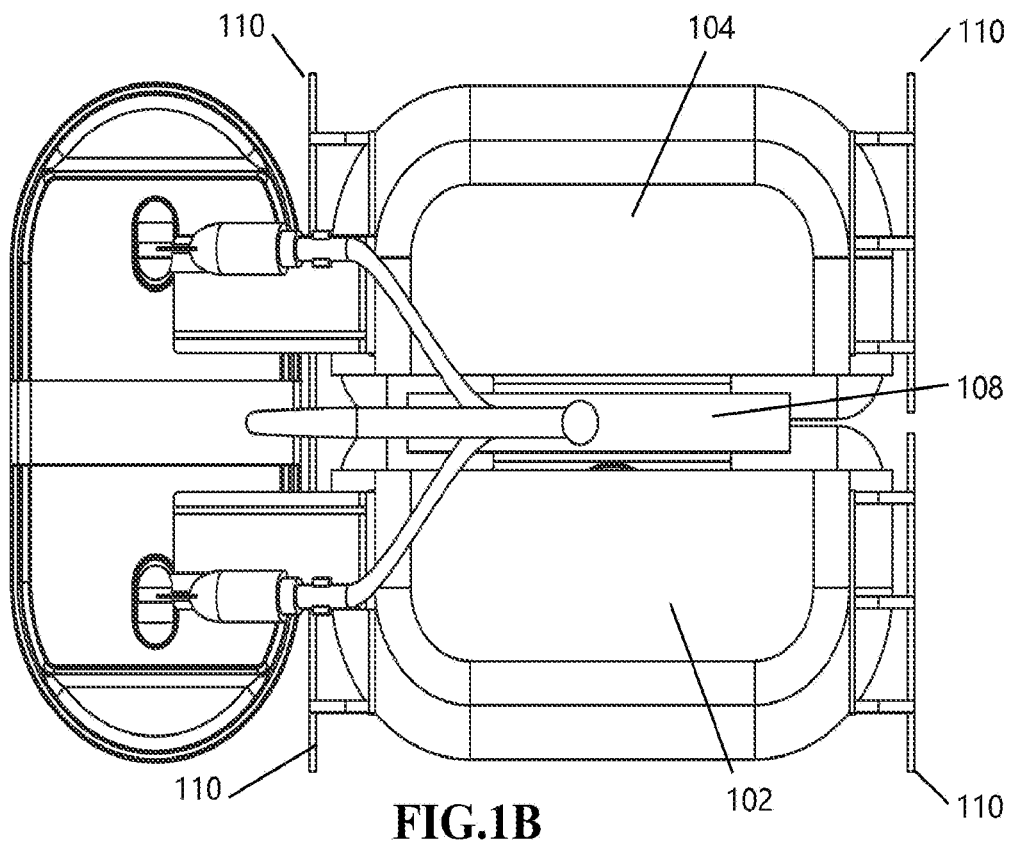
FIG. 1B is a top view of the robot of FIG. 1A.

Referring to FIG. 1A and FIG. 1B, a robot 100 comprises a cleaning compartment 120 and a first module 102 and a second module 104 that are connected to the cleaning compartment 120 by supports 112 and 114. The supports 112, 114 apply a downward tension to separate sections of the cleaning compartment 120 and are independently flexible. The first module 102 and the second module 104 are connected by a hinge 106 with gears.

Figure 2A:
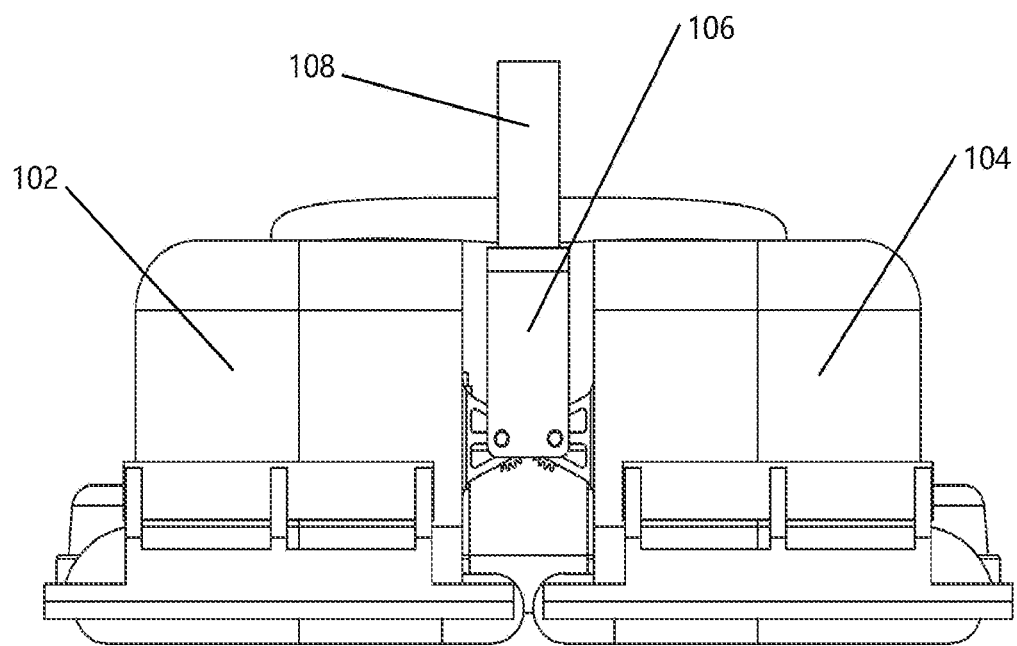
FIG. 2A is a rear view of the robot of FIG. 1A.
Figure 2B:
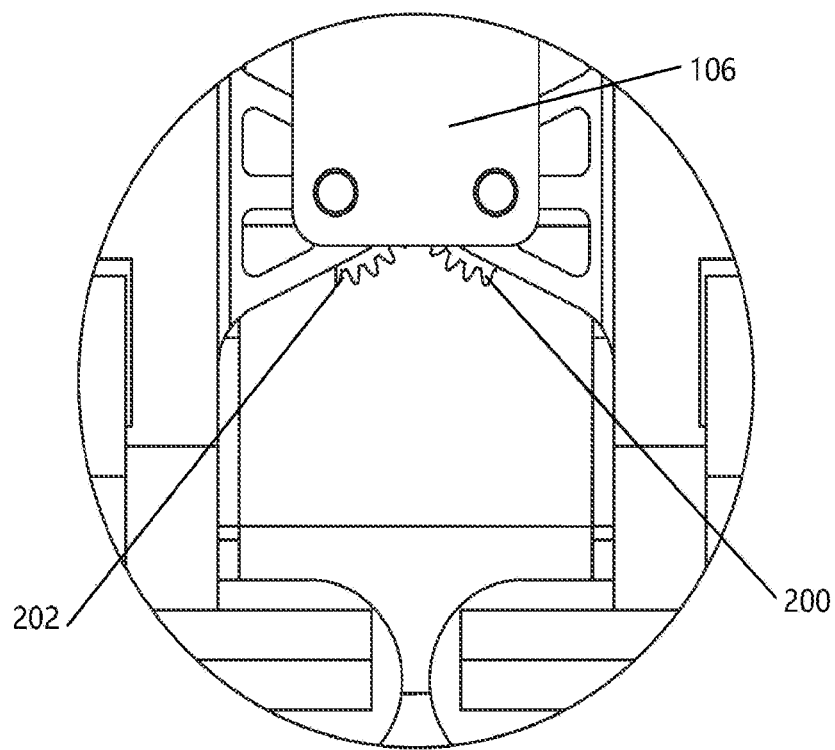
FIG. 2B is an enclosed view of a portion of FIG. 2A showing a hinge with gears.
Figure 3A:
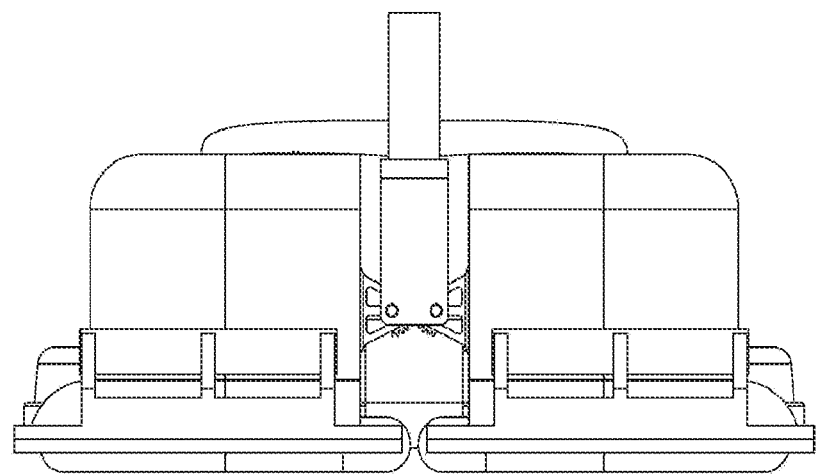
FIG. 3A, FIG. 3B and FIG. 3C are rear views of the robot of FIG. 1A showing the operation of the hinge with gears to render the robot flexible.
Figure 3B:
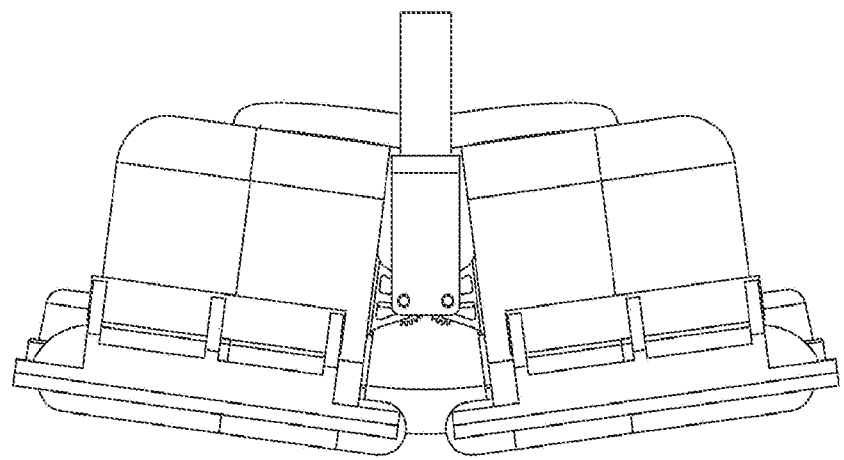
Figure 3C:
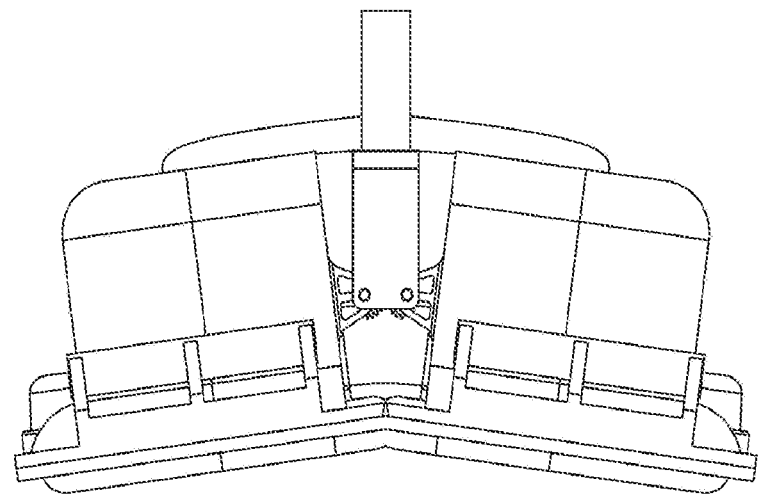

As shown in FIG. 2A and FIG. 2B, two gears 200, 202 are fixed on each respective module 102, 104 of the robot 100. The modules 102, 104 are connected by a frame 108 while the gears 200, 202 are engaged. The modules 102, 104 of the robot 100 pivot in a clockwise or counterclockwise direction while the frame 108 remains upright. Thus the robot 100 can conform to the turbine blade surface better than one solid piece in the same size. FIGS. 3A to 3C show the states when the robot 100 conforms to a flat surface (FIG. 3A), a concave surface (FIG. 3B) and a convex surface (FIG. 3C).

Figure 4A:
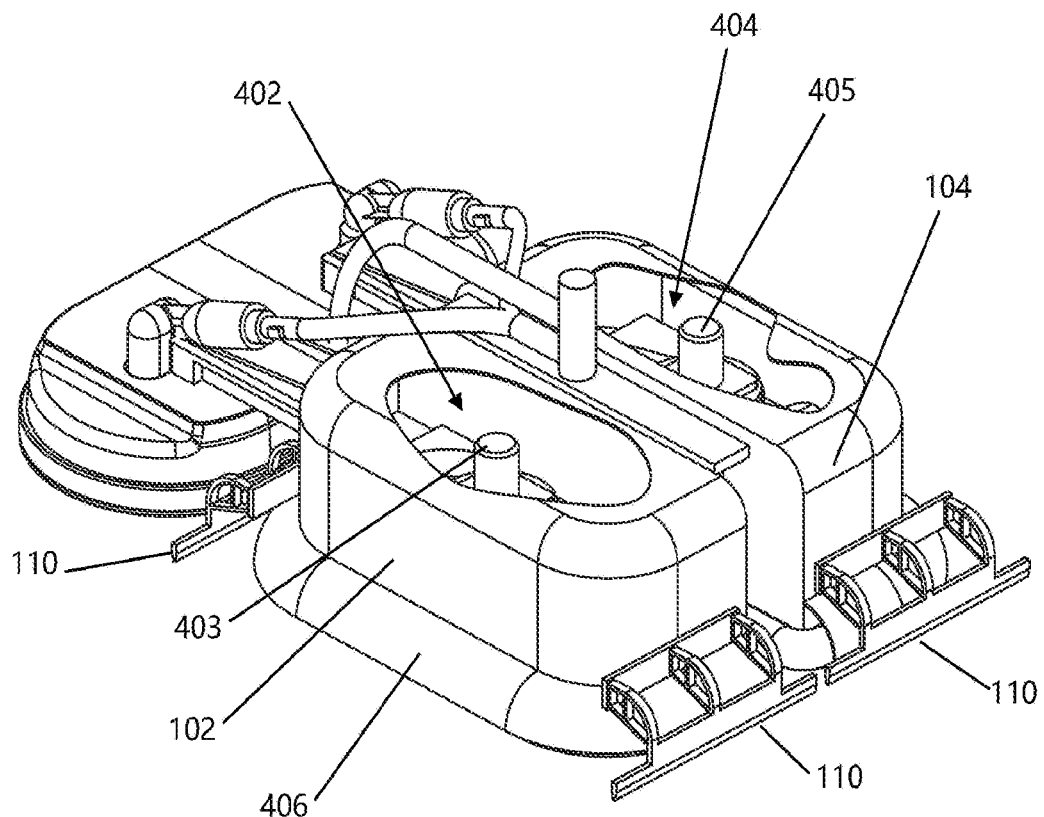
FIG. 4A is a cutaway view of two suction chambers of the robot.

Referring to FIG. 4A each module 102, 104 of the robot 100 has a suction chamber 402, 404 that has a vacuum motor assembly 403, 405 to generate low pressure inside the respective suction chamber. The air inside each suction chamber 402, 404 is extracted by the vacuum motor assembly 403, 405, so the pressure inside the suction chamber 402, 404 is lower than that outside the suction chamber 402, 404. The robot 100 is compressed onto the turbine blade surface by the difference of pressure. When the robot 100 is put onto a surface, a flexible cleaning ring 406 under each chamber 402, 404 contacts the blade surface. The flexible cleaning ring 406 circumscribes the bottom opening of the respective suction chamber. The flexible cleaning ring 406 also prevents the air outside the robot 100 from getting into the suction chamber 402, 404.

Figure 4B:
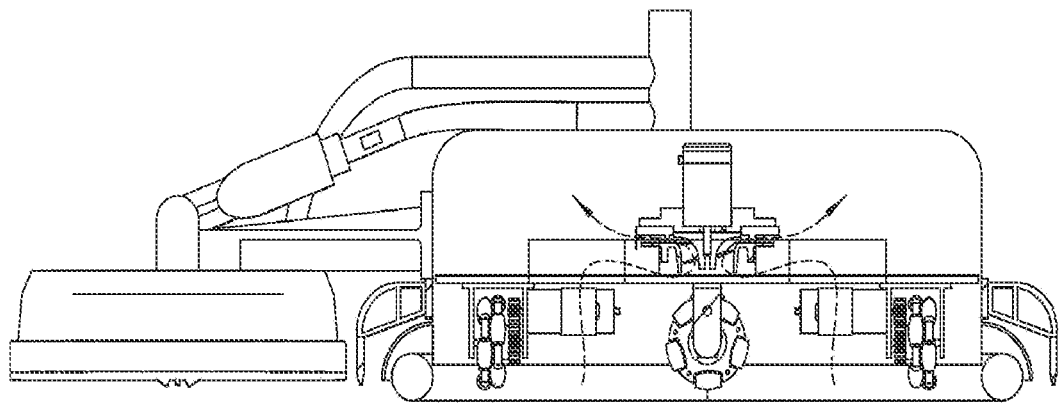
FIG. 4B and FIG. 4C are cut away views showing air flow through the robot.
Figure 4C:
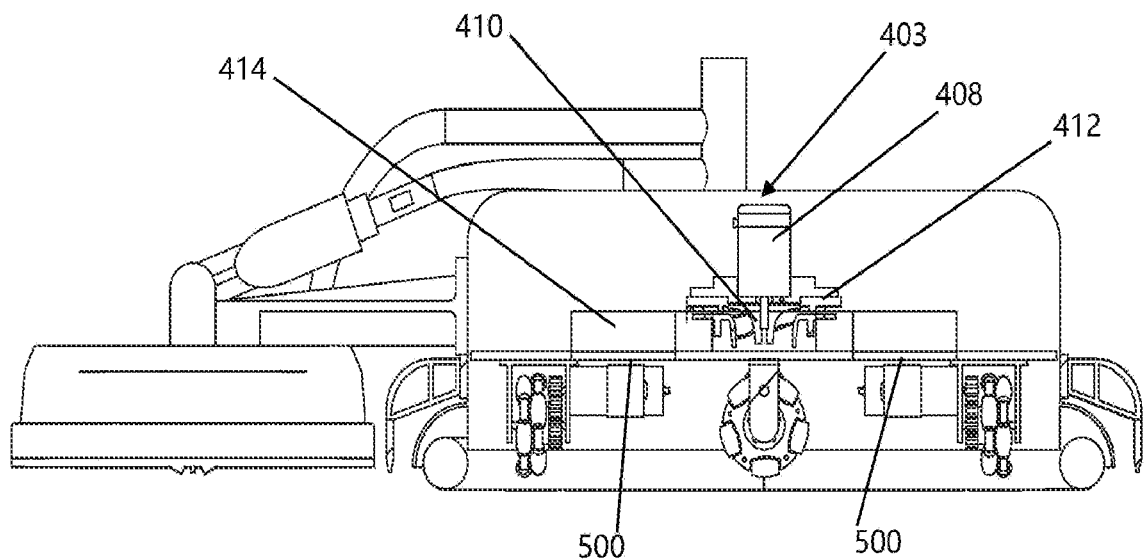

Referring to FIG. 4B and FIG. 4C, the vacuum motor assembly 403, 405 includes a suction motor 408 and a propeller 410 to direct the air flow out of the respective suction chamber through the manifold 412. Each suction chamber has an air inlet 500. The air flows into the air inlet 500, through a filter 414, is compressed by the propeller 410 inside the vacuum motor assembly 403, 405 and is expelled out of the manifold 412.

Figure 5A:
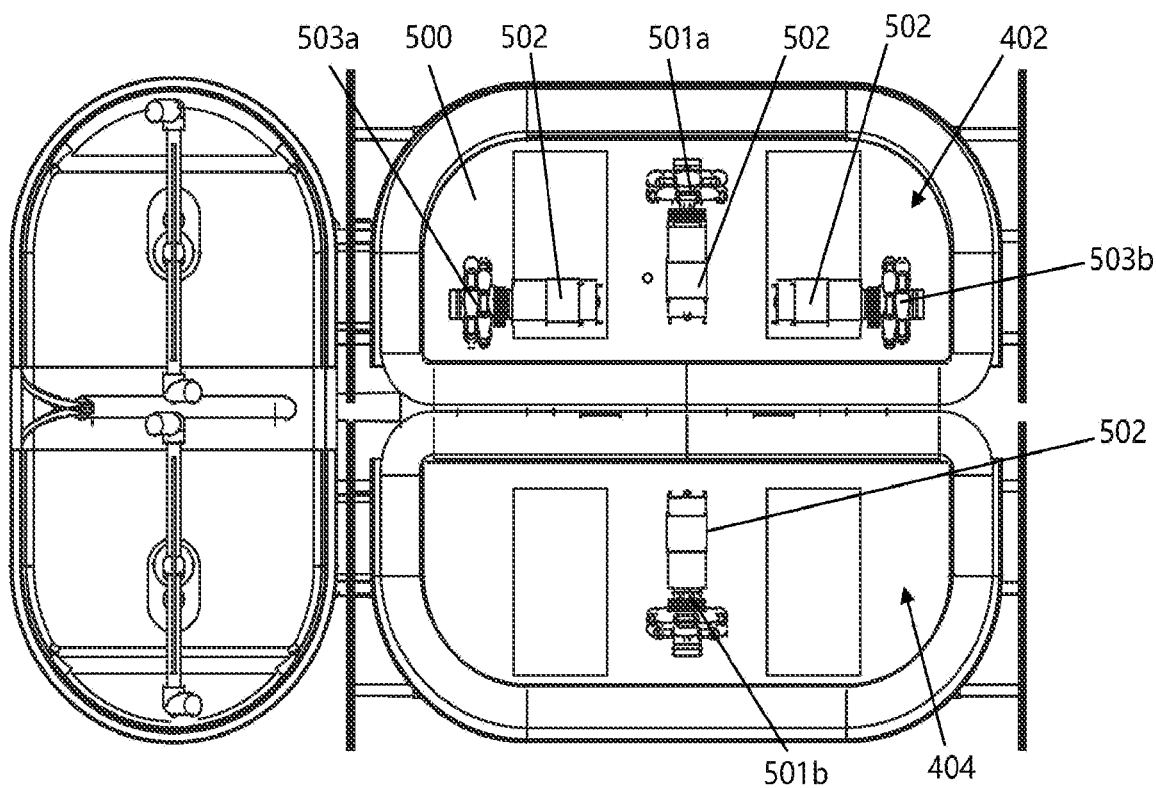
FIG. 5A and FIG. 5B are bottom views of the robot showing an embodiment with four wheels.
Figure 5B:
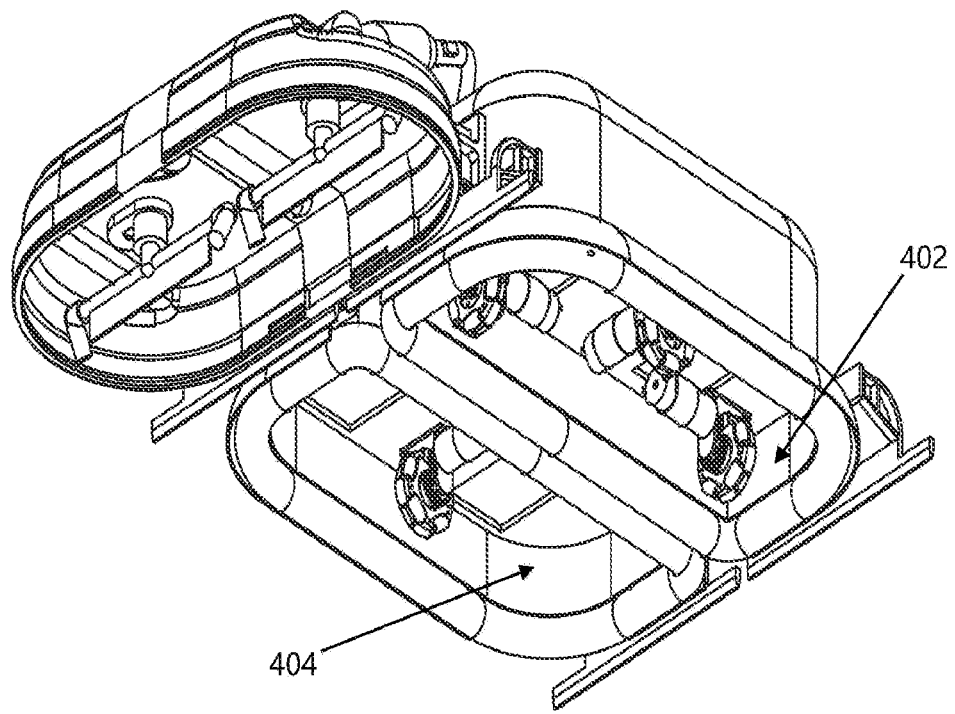

Referring to FIG. 5A and FIG. 5B the robot 100 moves along the turbine blade surface by virtue of a driving mechanism (e.g. a means for moving) to clean debris on the surface. The driving mechanism is coupled to a drive motor 502 that actuates the driving mechanism. In the embodiment of the driving mechanism in FIG. 5A and FIG. 5B there are four omni-directional wheels (e.g., Mecanum wheel) 501a, 501b, 503a and 503b and four drive motors 502 to drive each respective wheel. Four wheels are divided into two groups; a first group consists of wheels 501a, 501b while a second group consists wheels 503a, 503b. In FIGS. 5A-5B, the robot 100 moves left and right when the wheels 501a, 501b in the first group rotate. The robot 100 moves forward and backward when the wheels 503a, 503b in the second group rotate. The robot 100 can also move in any direction or rotate by independently controlling the rotary direction of each one of the four wheels, 501a, 501b, 503a, and 503b. In this manner the robot 100 is capable of omni-directional movement.

Figure 6A:
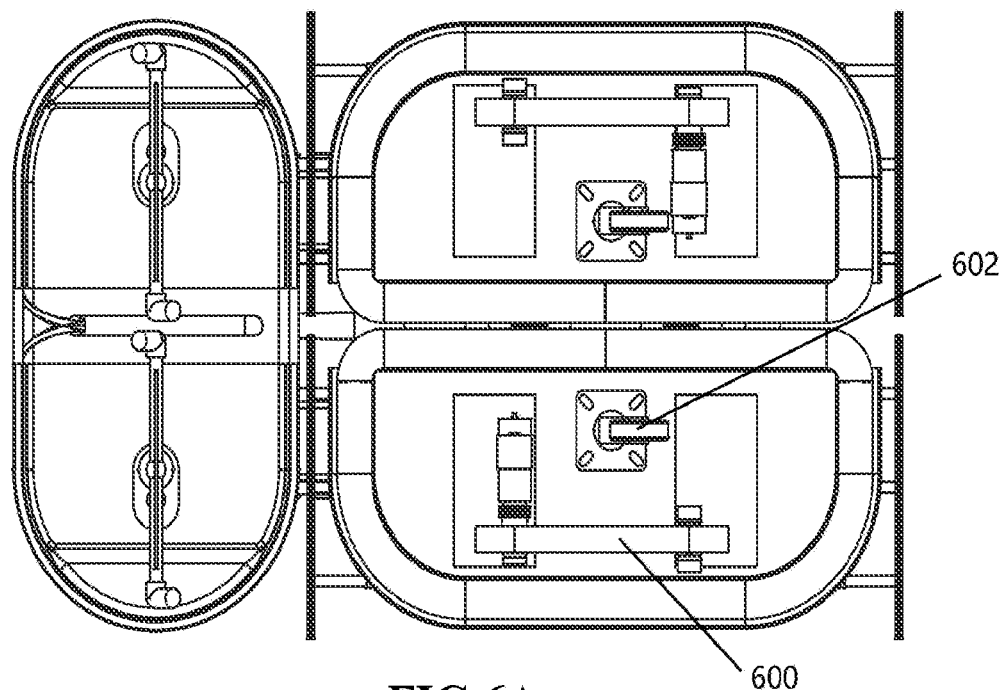
FIG. 6A and FIG. 6B are bottom views of the robot showing an embodiment with two drive trains and two caster wheels.
Figure 6B:
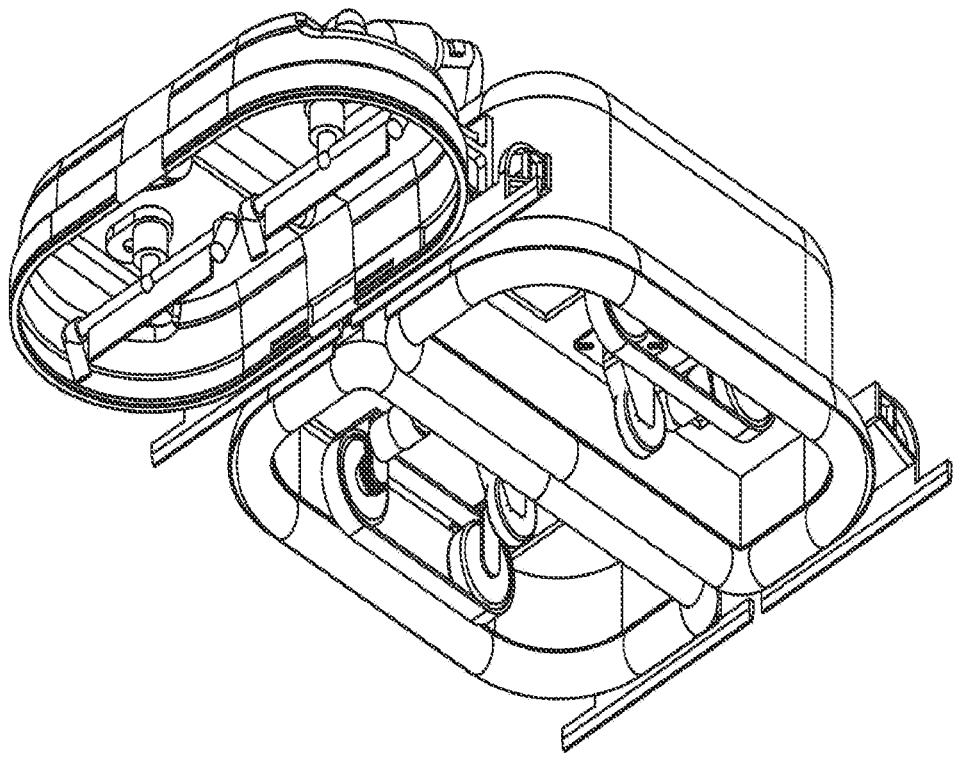

FIG. 6A and FIG. 6B show an embodiment of the driving mechanism with two drive trains 600 and two caster wheels 602. The caster wheels 602 are used to balance each half module 102, 104 of the robot 100. In one embodiment, the caster wheels 602 are spring tensioned to allow vertical mobility as the vacuum pulls the robot 100 toward the blade surface. The whole robot 100 can move forward and backward and make left and right turns or spin around the center point of the robot 100 by control the speed of motors of two drive trains 600 using a differential drive.

Figure 7:
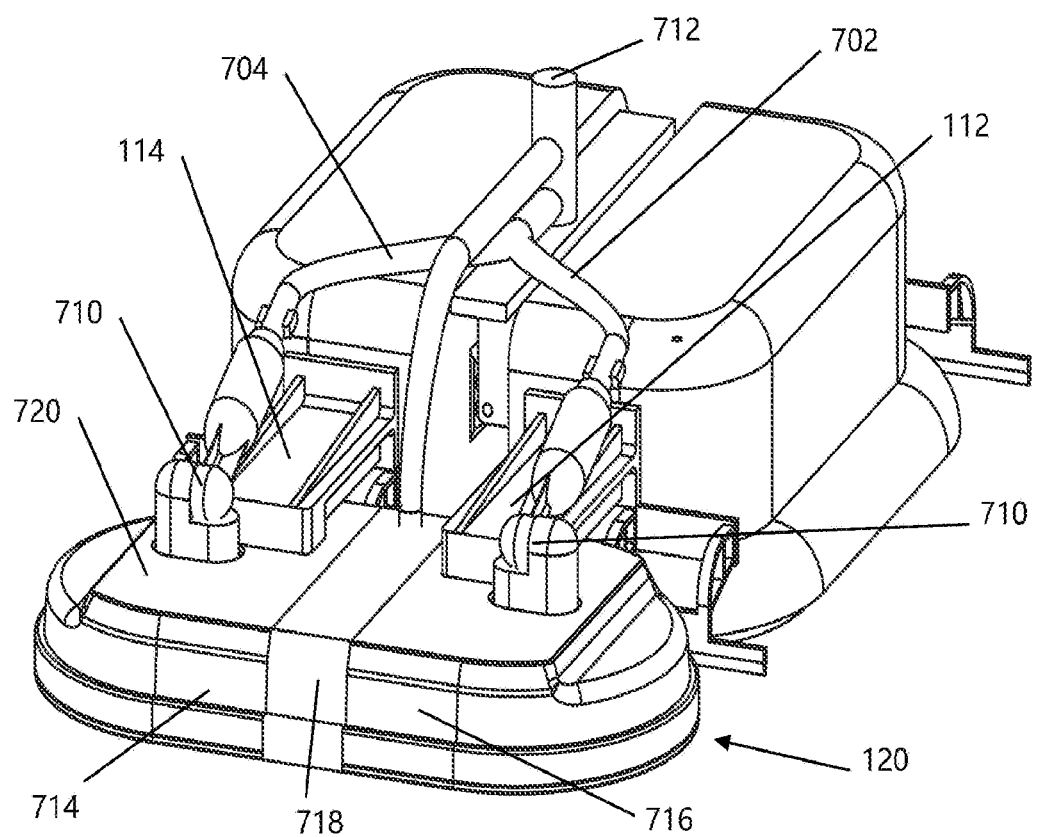
FIG. 7 is a perspective view of one embodiment of the robot.
Figure 8A:
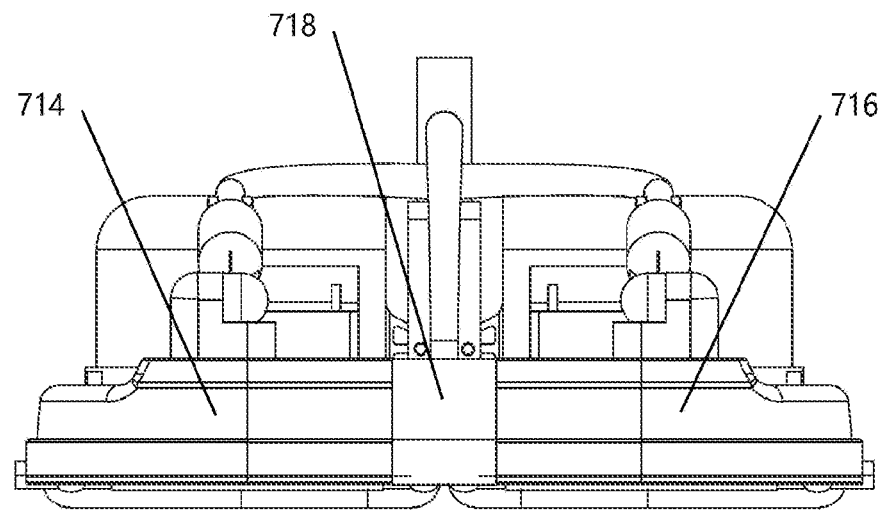
FIG. 8A, FIG. 8B and FIG. 8C are front views of the robot showing the flexibility of the cleaning compartment.
Figure 8B:
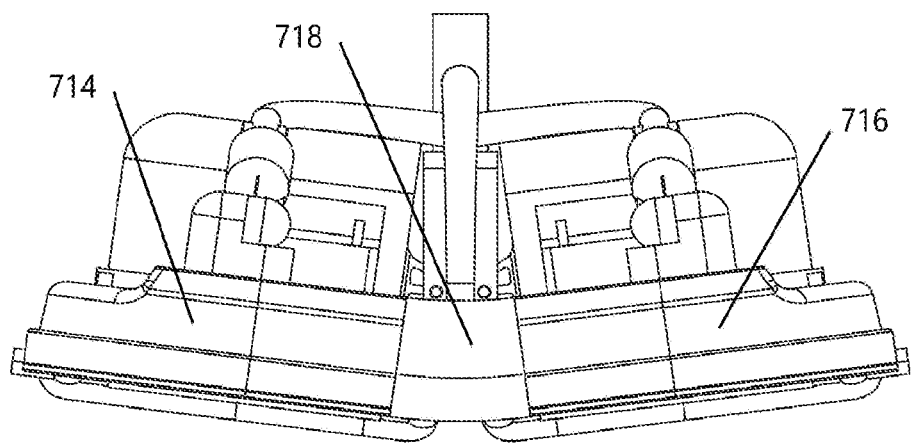
Figure 8C:
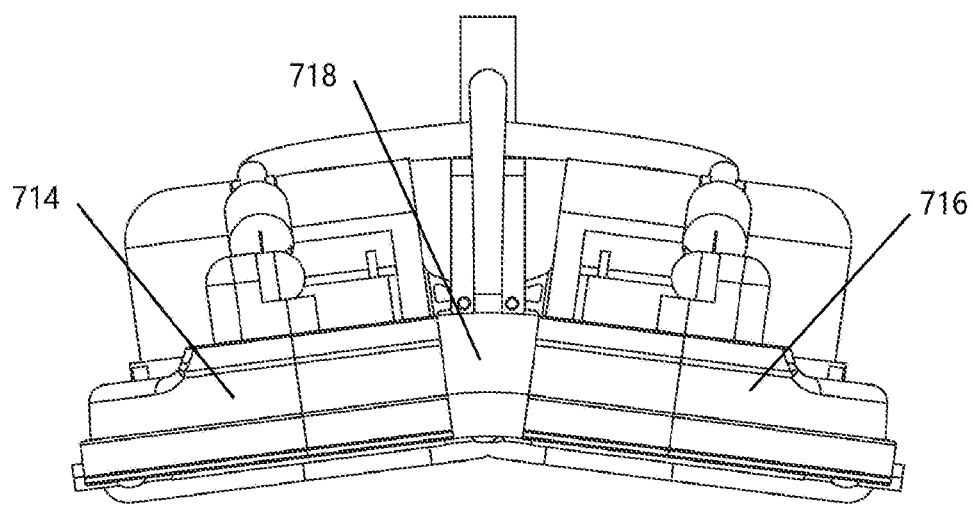

Referring to FIG. 7, in one embodiment, supply lines 702, 704 are hollow pipes that convey water from a connector 712 to the cleaning compartments 706, 708. The cover 720 of the cleaning compartment 120 is divided into two sections 714, 716 and connected by flexible material 718, such as silicon rubber, which can conform to the curvature of the turbine blade surface. In one embodiment, the two sections 714, 716 are symmetrically disposed about the flexible material 718. The sections 714, 716 are substantially ridged and may be formed from a durable plastic, such as a rigid polymeric material. In one embodiment, the supply lines 702, 704 are ridge water pipes and couple the hinging through ball connector 712 of the sections 714, 716 to the hinging of the suction modules 102, 104. In another embodiment, supply lines 702, 704 are flexible hosing that convey water. On a flat surface, the bottom opening of the cleaning compartment 120 is coplanar with the bottom opening of the suction chambers 402, 404. FIG. 8A, FIG. 8B and FIG. 8C depict the hinging motion of the cleaning compartment 120.

Figure 9A:
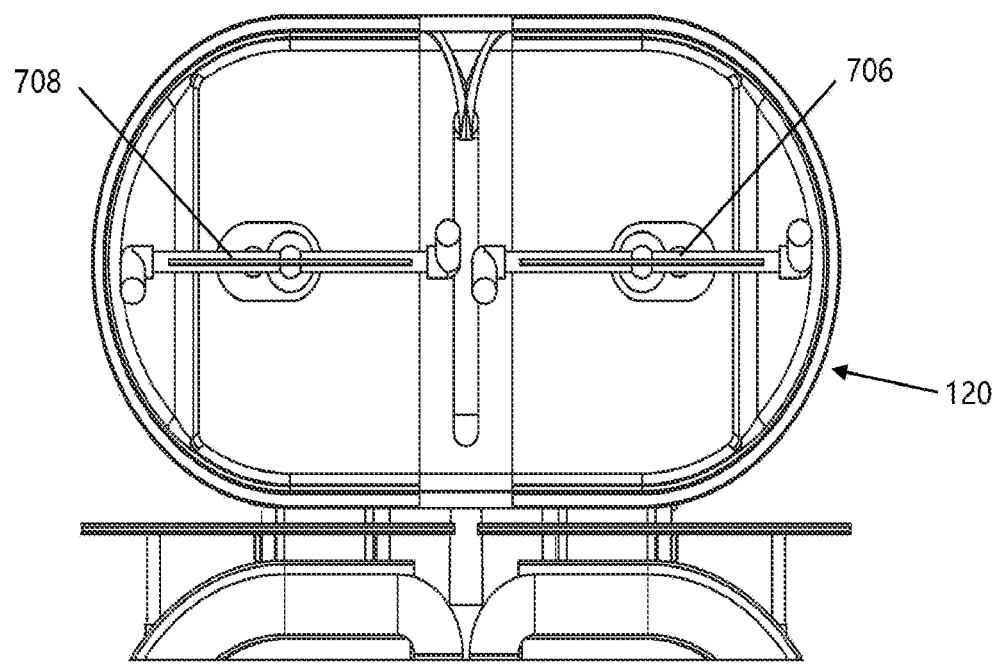
FIG. 9A and FIG. 9B are bottom views of the robot showing a cleaning compartment.
Figure 9B:
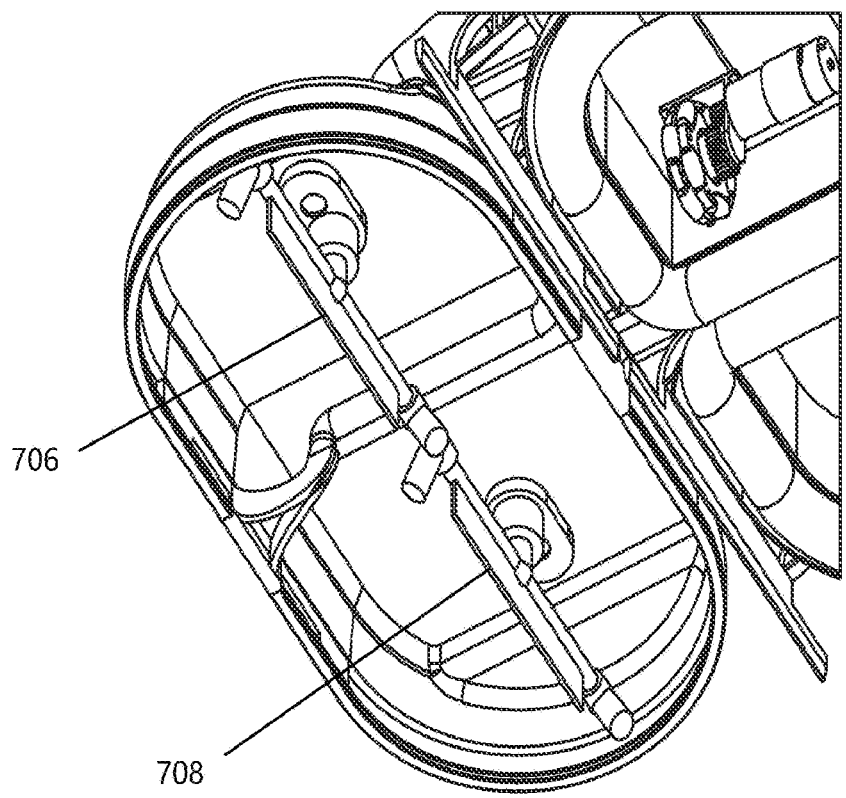

Referring to FIG. 9A and FIG. 9B, high pressure water is used to clean the surface of the wind turbine blade. High pressure water is supplied to the robot 100 by any high-pressure washer equipment. High pressure water connects to the robot 100 at connector 712 and is directed into the supply lines 702, 704 and sent into the spray nozzles 706, 708 (see FIG. 8) respectively, inside the cleaning compartment 120, which is open on the bottom. There are two spray nozzles 706, 708 inside the cleaning compartment 120 and both nozzles can rotate freely when high pressure water is supplied. In one embodiment, there are four squeegees 110 in front and back end of the robot. The squeegees 110 can wipe out the water traces on the surface.

Figure 10A:
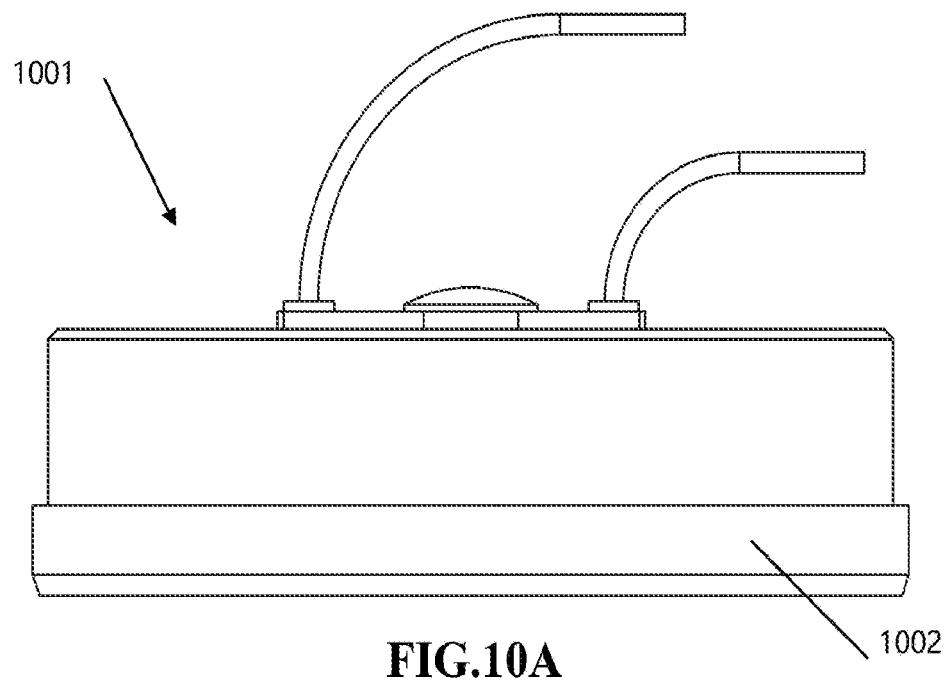
FIG. 10A, FIG. 10B and FIG. 10C are respectively a main view, a perspective view and a bottom view of the cleaning compartment showing an embodiment with a round shape.
Figure 10B:
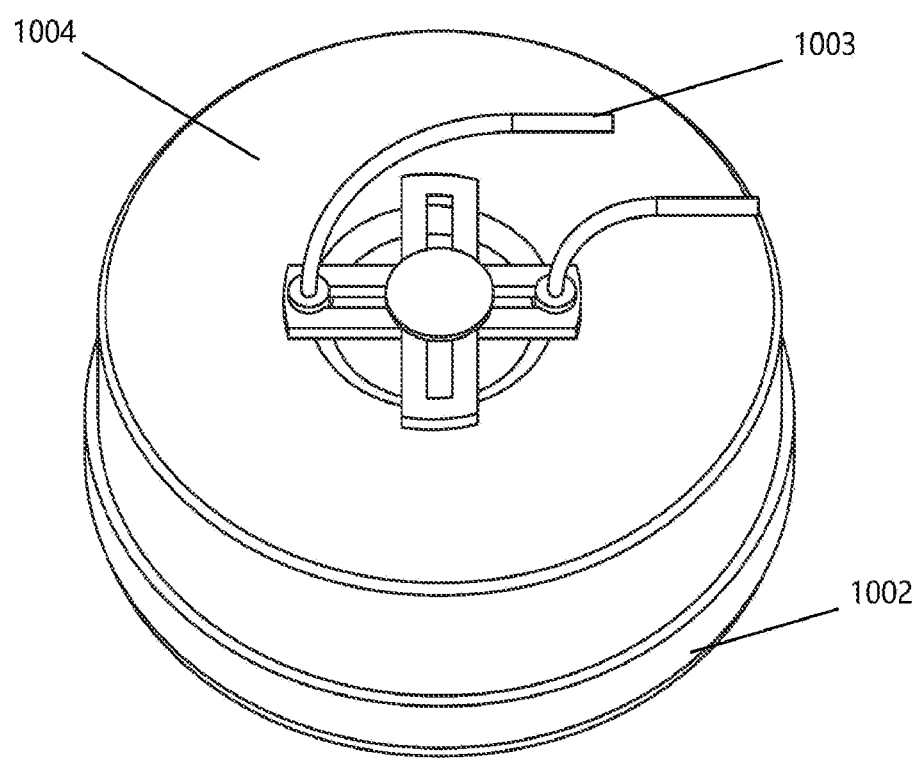
Figure 10C:
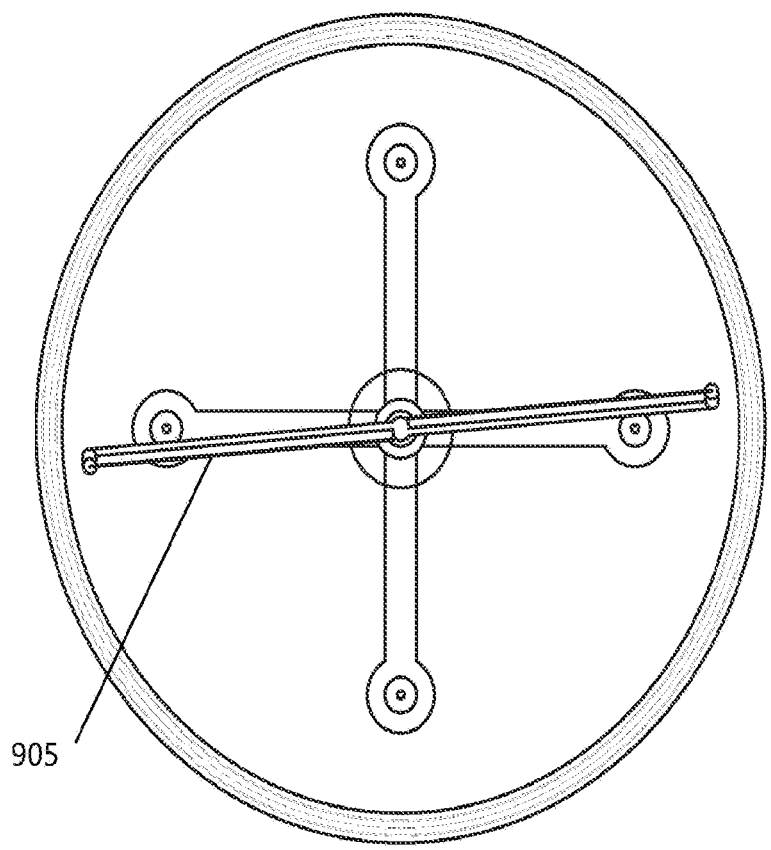

FIGS. 10A, 10B and 10C show another embodiment of a cleaning compartment 1001 with round shape. In one embodiment, the supply lines 1003 are flexible hollow pipes that convey water from a connector to the cleaning compartment 1005. There is a flexible cleaning ring 1002 (e.g. an O-shaped microfiber cloth) under the cover 1004 to clean the dirt on surface.

Figure 11A:
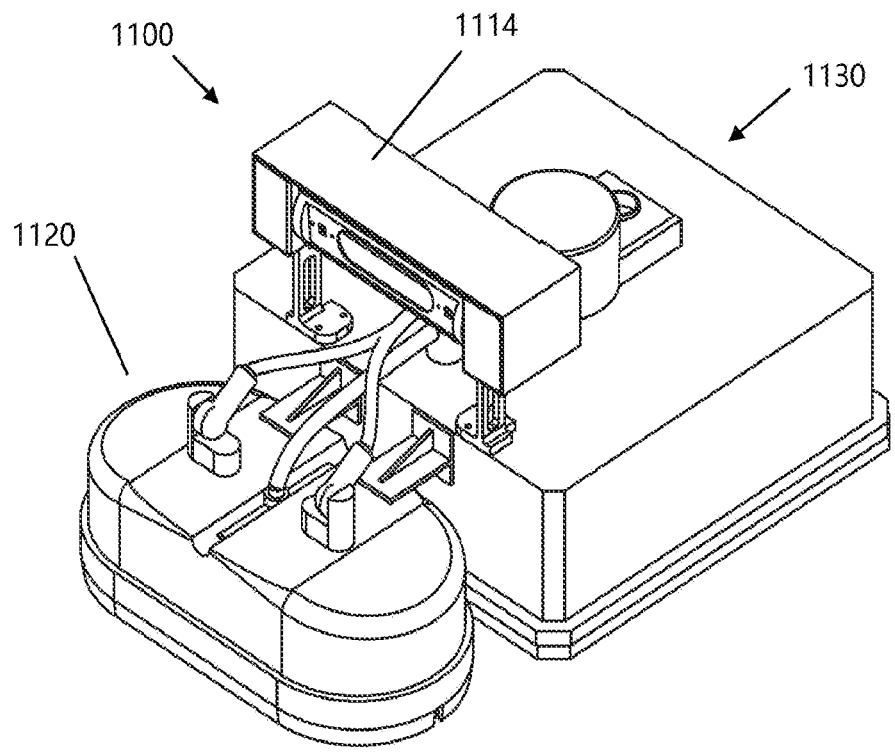
FIG. 11A is a perspective view of the robot showing an embodiment with two drive trains and a suction chamber.
Figure 11B:
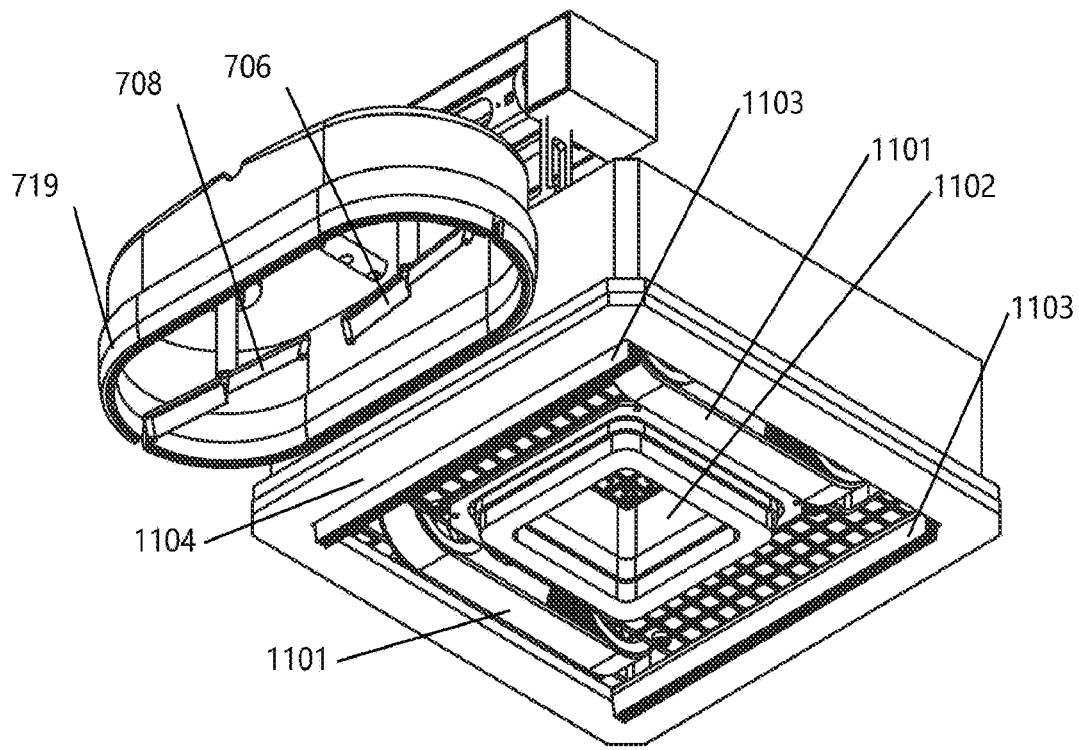
FIG. 11B and FIG. 11C are bottom views of the embodiment of the robot shown in FIG. 11A.
Figure 11C:
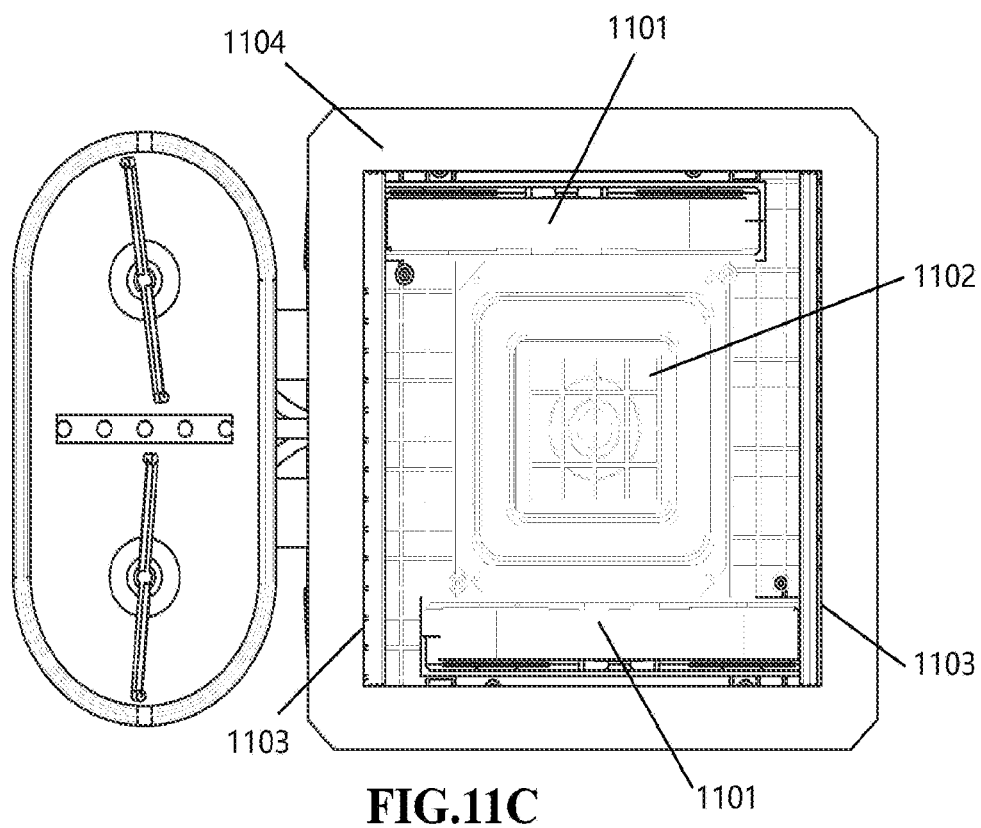

FIG. 11A, FIG. 11B, FIG. 11C and FIG. 11D show an embodiment of the robot 1100 with a single module 1130, a cleaning compartment 1120 and an inspection camera 1114. As shown in FIG. 11B, the module 1130 comprises two drive trains 1101 and a flexible suction chamber 1102. The robot 1100 can move forward, backward, and make left and right turns or spin around the center point of the robot 1100 by controlling the speed of motors of two drive trains 1101 using a differential drive. At the bottom of the module 1130, a cleaning ring 1104 circumscribes the lower perimeter of the module 1130. The cleaning ring 1104 can clean the dirt on blade surface and also prevent the soiled water getting the tread of the drive trains wet. The inner sides of the cleaning ring 1104 are installed with squeegees 1103 to clean the adsorption surface and keep the drive trains dry. In the embodiment depicted in the figures there are two squeegees 1103 at the front and back inner sides, respectively. In one embodiment, the cleaning ring 1104 is a microfiber cloth serving the purpose of cleaning the blade surface and preventing water and air into the inner side of the flexible cleaning ring 1104.

In one embodiment as shown in FIG. 11B, the cleaning compartment 1120 has one module with two spray nozzles 706, 708. The scrapper 719 under the cleaning compartment 1120 is made of soft and flexible material such as micro-fiber cloth to remove the dirt and conform to curvature of blade surface. The supply lines 1112 are flexible hollow pipes that convey water from a connector to the cleaning compartment 1120.

Figure 11D:
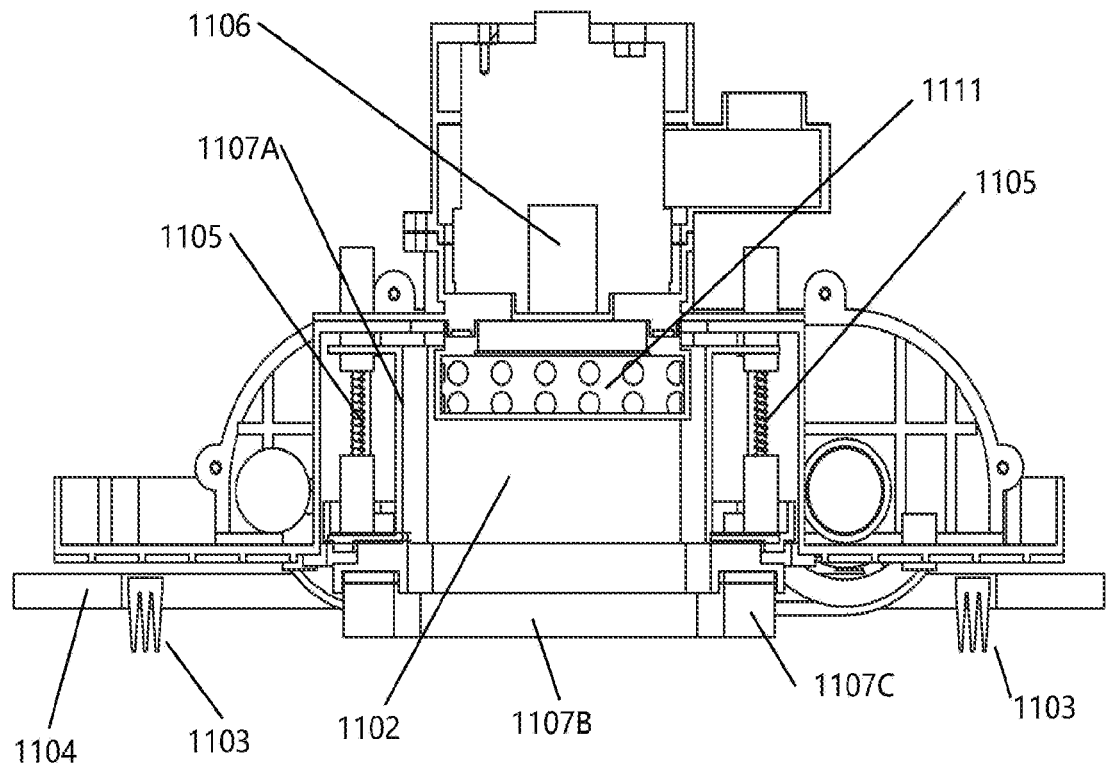
FIG. 11D is a cutaway view of the suction chamber.

Referring to FIG. 11D, the actuation of a vacuum motor assembly 1106 creates a vacuum in a flexible suction chamber 1102 by the indraft of air from the gaps between the contact surface and bottom side of the robot. The vacuum makes the robot attach on the surface. The vacuum state in the flexible suction chamber 1102 is maintained by the deformation of both a compliant seal assembly 1107 and a plurality of spring/rod pairs 1105. The compliant deformation helps the robot 1100 attached to both convex and concave contact surfaces. The use of a compliant seal assembly 1107 and spring/rod pairs 1105 is also contemplated for use in the two-module embodiment of robot 100.

Figure 11E:
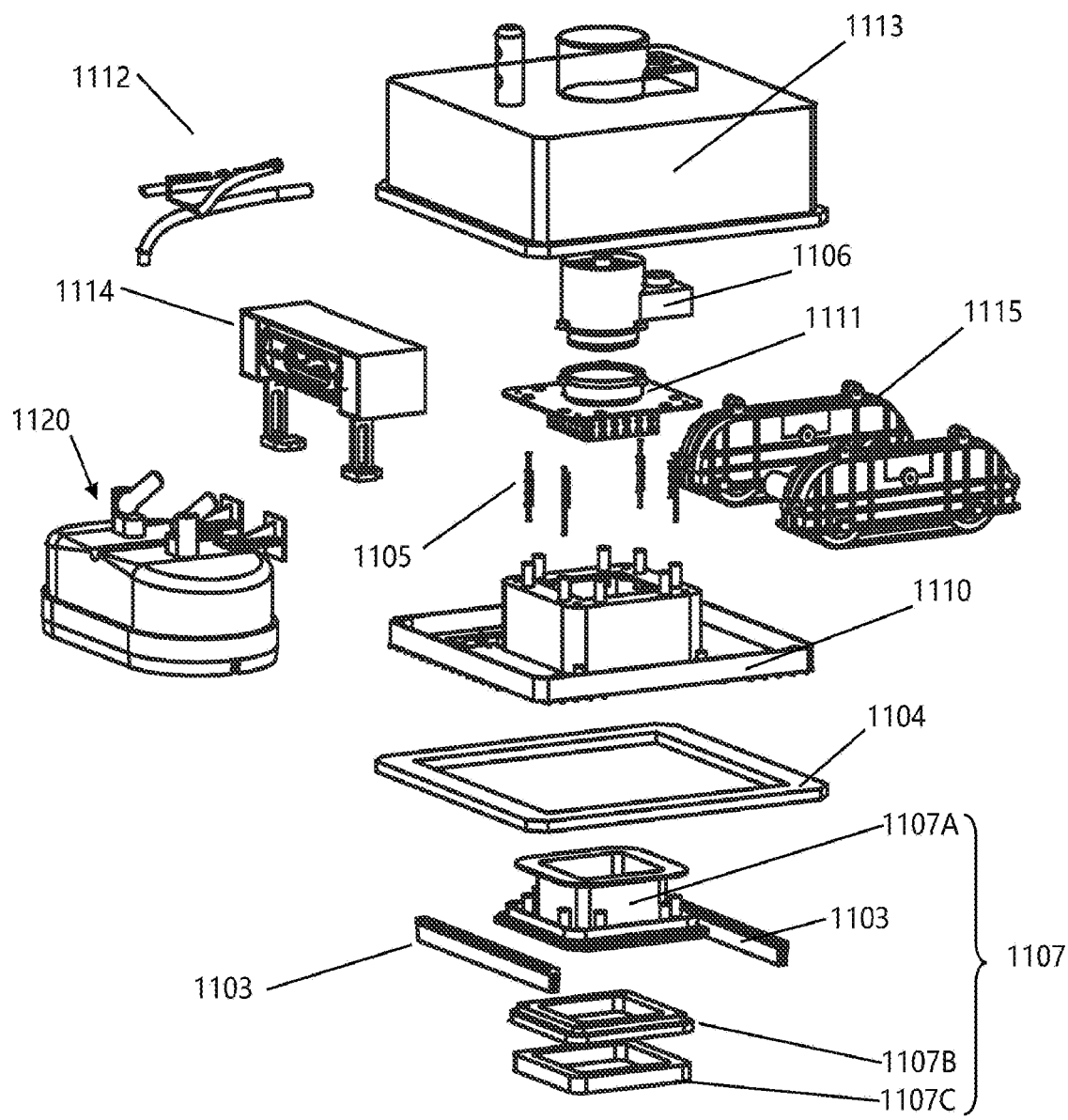
FIG. 11E is an explosion view of the robot shown in FIG. 11A.

FIG. 11E is an explode view of the robot 1100 which illustrates the robot housing 1110, the air filter 1111, the cover 1113, a means for moving 1115, the squeegees 1103, the cleaning ring 1104, the spring/rod pairs 1105, the vacuum motor assembly 1106 and the compliant seal assembly 1107. The housing 1110 forms the robot base that has a central compartment to host the compliant seal assembly 1107, so that the compliant seal assembly 1107 may move up and down, but not laterally, within the cavity of the central compartment. The compliant seal assembly 1107 further comprises a pocket mounting plate 1107B supported by spring/rod pairs 1105 at four corners making the compliant seal assembly 1107 vertically mobile, the flexible walls 1107A are flexible to permit the compliant seal assembly 1107 to move vertically. In one embodiment, the flexible walls 1107A are made of flexible air-tight fabric or plastic or silicone rubber material, which is clamped around the bottom pocket mounting plate 1107B in one end and the ceiling of the central compartment of the housing 1110 in the other end forming the flexible suction chamber 1102 within the central cavity. The compliant seal ring 1107C is clamped on the bottom side of the pocket mounting plate 1107B and is easily detachable for replacement. In one embodiment, the compliant seal ring 1107C is made of a foam ring wrapped inside an air-tight fabric pocket (e.g., hydrophobic material, polymer or Nylon material). The compliant seal ring 1107C circumscribes the open of the central cavity and conforms to the contact surface to avoid air leakage. The spring/rod pairs 1105 tension the compliant seal assembly 1107 against the blade while allowing vertical movement. The compliant seal assembly 1107 is designed to provide a wide range compliance deformation which makes the robot 1100 adapt to curved surfaces (both concave and convex).

As shown in FIG. 11D, the actuation of the vacuum motor assembly 1106 creates a vacuum in the flexible suction chamber 1102 by the indraft of air from the gaps between the contact surface and the compliant seal ring 1107C. The air flows through the flexible suction chamber 1102 into a filter 1111 to avoid damaging the propeller of the vacuum motor assembly 1106 by dust and debris. The air is discharged from a chimney-shaped exhaust so that there is no dust left inside the module 1130. The compliant seal assembly 1107 provides a wider range of compliance and maintains the vacuum state by the elastic deformation of both the spring/rod pairs 1105 and the compliant seal assembly 1107 as the robot 1100 is attached to the convex or concave contact surface.

A cover 1113 covers the whole module 1130 to protect the electronic components from water and dust. There is a bracket on the cover 1113 to hold the supply line 1112 for the cleaning compartment 1120. An RGB-D camera 1114 is mounted on the cover 1113 to provide close-up video stream and first-person view for human operators to monitor the cleaning state and inspect any defects on blade surface.

Figure 12A:
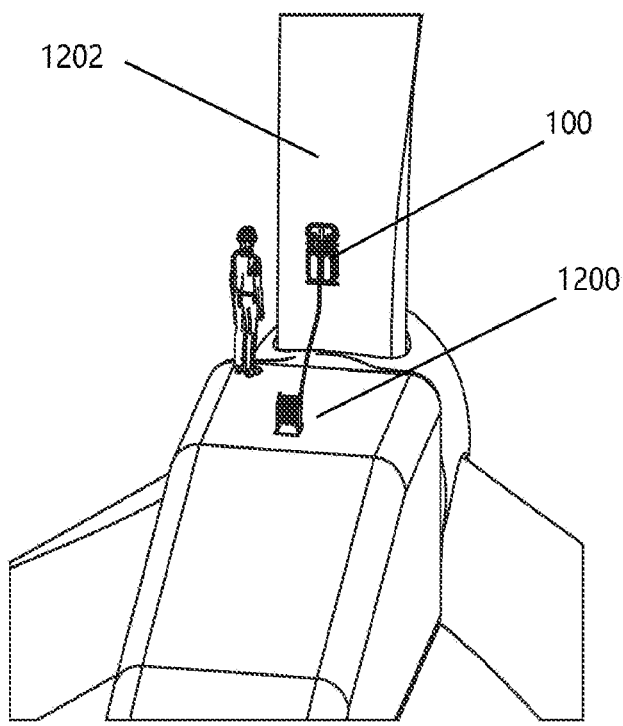
FIG. 12A and FIG. 12B are depictions of the robot while cleaning a turbine blade.
Figure 12B:
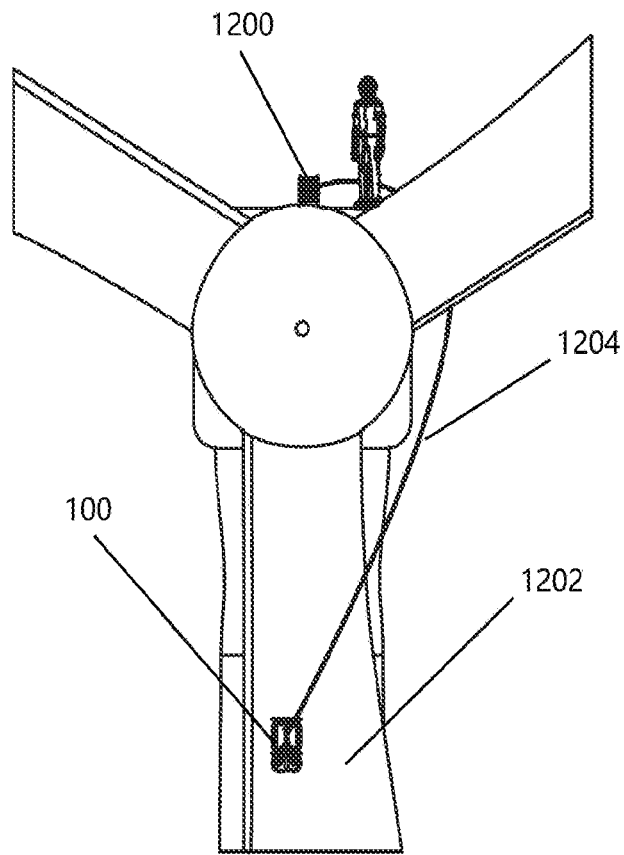

Referring to FIG. 12A and FIG. 12B, soiled water is accumulated inside the cleaning compartment 120 and subsequently flows from the bottom of the cleaning compartment 120 along the blade. The robot 100 is delivered to a cabin 1200 on top of the wind turbine tower and is put onto the wind turbine blade 1202 manually. A supply line 1204 provides electrical power and water to the robot 100. In one embodiment, the supply line 1204 includes a suction hose that connects to the robot instead of the on-board vacuum motor assembly 403, 405. A suction pump connects to the suction hose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A robot for cleaning wind turbine blades, the robot comprising:
   a suction module comprising a suction chamber with an open bottom and a compliant seal assembly that circumscribes the open bottom, wherein the compliant seal assembly contacts a surface;

a vacuum motor assembly for expelling air from the suction chamber, thereby adhering the open bottom to the surface;

a means for moving the robot along the surface;

a flexible cleaning ring circumscribing an opening on a bottom side of the robot;

a cleaning compartment comprising a cover with a first cleaning section flexibly joined to a second cleaning section by a flexible section, wherein the cover defines a bottom opening such that flexion of the flexible section bends the bottom opening in both a convex shape and a concave shape;

at least one spray nozzle disposed inside the cleaning compartment for spraying pressurized water at the bottom opening to clean the surface.

2. The robot as recited in claim 1, wherein the flexible section is a silicon rubber flexible section.

3. The robot as recited in claim 1, the cleaning compartment further comprising at least one vacuum opening that is connected to a suction pump for removing water from the cleaning compartment.

4. The robot as recited in claim 1, wherein the first cleaning section is connected to the suction module by a first support and the second cleaning section is connected the suction module by a second support, such that the cleaning compartment can adjust to non-planar areas on the surface by independent flexion of the first support and the second support.

5. The robot as recited in claim 1, wherein the first cleaning section and the second cleaning section are symmetrically disposed about the flexible section.

6. The robot as recited in claim 1, wherein the compliant seal assembly further comprises spring or rod pairs that permit vertical movement of the complaint seal assembly such that the compliant seal assembly is tensioned against the surface.

7. The robot as recited in claim 1, wherein the means for moving comprises at least one drive train.

8. The robot as recited in claim 1, wherein the means for moving comprises at least one wheel.

9. The robot as recited in claim 1, wherein the compliant seal assembly is disposed within a perimeter of the flexible cleaning ring.

10. A robot for cleaning wind turbine blades, the robot comprising:

a first suction module and a second suction module, each comprising a suction chamber with an open bottom and a flexible cleaning ring that circumscribes the open bottom, wherein the flexible cleaning ring contacts a surface;

vacuum motor assembly for expelling air from the suction chamber, thereby adhering the open bottom to the surface;

a means for moving the robot along the surface;

a hinge that flexibly connects the first suction module to the second suction module such that the robot adjusts to non-planar areas on the surface;

a cleaning compartment comprising a cover with a first cleaning section flexibly joined to a second cleaning section by a flexible section, wherein the cover defines a bottom opening such that flexion of the flexible section bends the bottom opening in both a convex shape and a concave shape, the first cleaning section being connected to the first suction module by a first support and the second cleaning section being rigidly connected the second suction module by a second support, such that the cleaning compartment can flex to conform to non-planar areas on the surface;

at least one spray nozzle disposed inside the cleaning compartment for spraying pressurized water at the bottom opening to clean the surface.

11. The robot as recited in claim 10, wherein the hinge is a geared hinge.

12. The robot as recited in claim 10, wherein the first support and the second support undergo independent flexion such that the first cleaning section and the second cleaning section flex independently.

13. The robot as recited in claim 10, the cleaning compartment further comprising at least one vacuum opening that is connected to a suction pump for removing water.

14. The robot as recited in claim 10, the first cleaning section and the second cleaning section are symmetrically disposed about the flexible section.

15. The robot as recited in claim 10, wherein the first suction module and the second suction module each comprise a compliant seal assembly with spring or rod pairs that permit vertical movement of the complaint seal assembly such that the compliant seal assembly is tensioned against the surface.

16. The robot as recited in claim 10, wherein the means for moving comprises at least one drive train.

17. The robot as recited in claim 10, wherein the means for moving comprises at least one wheel.

* * * * *